United States Patent [19]

Smith

[11] Patent Number: 4,735,817
[45] Date of Patent: Apr. 5, 1988

[54] METHOD OF CASING A FOOD PRODUCT IN THE MANUFACTURE OF INDIVIDUAL SLICES OF THE PRODUCT

[75] Inventor: Robert M. Smith, Beaumaris, Australia

[73] Assignee: Alfa-Laval Cheese Systems Limited, Somerset, England

[21] Appl. No.: 891,579

[22] Filed: Aug. 1, 1986

[30] Foreign Application Priority Data

Aug. 20, 1985 [GB] United Kingdom ............... 8520830

[51] Int. Cl.$^4$ .......................................... A23C 19/02
[52] U.S. Cl. .................... 426/517; 426/518; 426/582; 99/464; 99/466
[58] Field of Search ............... 426/512, 517, 518, 582, 426/302; 99/460-466

[56] References Cited

U.S. PATENT DOCUMENTS

| 2,361,775 | 10/1944 | Kraft | 426/414 |
| 3,141,779 | 7/1964 | Podebradsky et al. | 426/582 |
| 3,887,719 | 6/1975 | Miller | 426/517 |
| 3,900,574 | 8/1975 | Warwick | 426/582 |

*Primary Examiner*—Raymond N. Jones
*Assistant Examiner*—Marianne M. Cintins
*Attorney, Agent, or Firm*—Davis Hoxie Faithful & Hapgood

[57] ABSTRACT

A method of manufacturing slices of processed cheese in which a hot cooked mass of the cheese is extruded onto a moving endless belt formed of plastics material provided with a release coating which does not adhere to the cheese, the mass of cheese is spread by a roller into a thin layer, the layer of cheese is carried by the belt through a cooling chamber where the cheese solidifies, and the solidified layer of cheese is peeled from the belt and divided to form individual slices. In a modification, the hot mass of cheese is extruded onto a moving web of film plastics material supported on an endless belt conveyor, the web being fed from a roll of the material at the upstream end of the conveyor and the solidified layer of cheese being peeled from the web before the web is rewound on a reel at the downstream end of the conveyor. In a further modification, the web carrying the solidified layer of cheese is peeled from the endless belt, slit longitudinally into strips which are superimposed on one another and then divided transversely to form stacks of individual cheese slices interleaved with film plastics material.

6 Claims, 2 Drawing Sheets

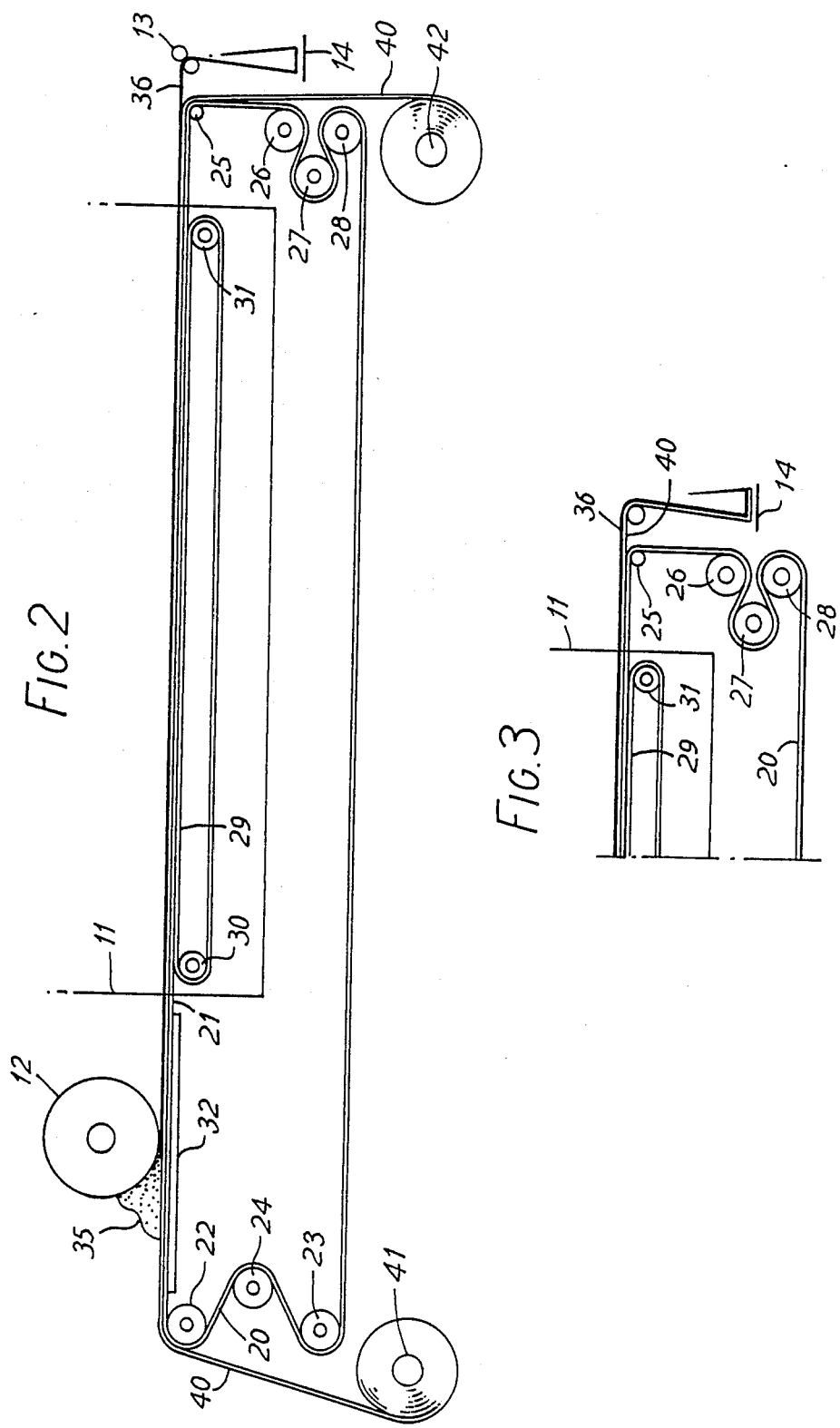

METHOD OF CASING A FOOD PRODUCT IN THE MANUFACTURE OF INDIVIDUAL SLICES OF THE PRODUCT

This invention relates to the processing of a solid food product which is plastic or viscous when heated, and is concerned more particularly in the casting and solidifying of such a food product into a thin layer which is subdivided to form separate thin slabs resembling individual slices of the food product. Such thin slabs will hereinafter for convenience be referred to as slices.

The invention is particularly applicable to the casting and solidifying of a hot cooked cheese mass in the manufacture of slices of processed cheese, and the invention will be described with reference to this application.

In a known method of manufacturing slices of processed cheese, a mixture of raw cheese, semi-matured cheese and fully matured cheese is heated to form a hot mass which is then extruded onto a continuously moving steel belt of an endless belt conveyor. The hot cheese mass is spread into a thin layer on the moving belt by a rotating roller spaced above the belt, the hot cheese is carried by the conveyor through a cooling chamber where the cheese solidifies into a broad strip of cheese, and the broad strip of cheese is slit longitudinally into narrow strips which are superimposed one on another and then divided transversely to form stacks of individual slices of cheese.

In this known method of manufacture, the hot cheese mass tends to adhere to the steel belt and when the cheese has solidified it it necessary to scrape the cheese off the belt by means of doctor blades. Such blades are difficult to adjust and maintain, and require frequent attention in operation.

According to one aspect of the invention there is provided a method of producing individual slices of a solid food product containing fat which is plastic or viscous when heated, comprising casting a hot mass of the product onto a web of flexible sheet material which does not adhere to the product, spreading the product into a layer having a thickness equal to the desired thickness of the slices, moving the web together with the layer of product thereon through a cooling chamber to slidify the product into a solid moving strip, peeling the strip from the moving web, and then dividing the strip into individual slices.

The web of flexible sheet material may comprise a web of plastics material coated with a release agent which prevents the plastics material adhering to any food containing fat. Plastics film material coated with such release agents are well known in the art and are in common use for wrapping food products containing fat, such as for example cheese.

The web of flexible sheet material may comprise the top run of the belt of an endless belt conveyor. Alternatively the web of flexible sheet material may be supported on the top run of the belt of an endless belt conveyor, the web being fed from a roll of the material at the upstream end of the conveyor and the web being wound onto a reel at the downstream end of the conveyor.

According to another aspect of the invention there is provided a method of producing individual slices of a solid food product which is plastic or viscous when heated, comprising casting a hot mass of the product onto a web of flexible sheet material supported on the upper run of the belt of an endless belt conveyor, spreading the product into a layer having a thickness equal to the desired thickness of the slices, cooling the layer of product on said web to solidify the product into a solid strip, dividing the web of sheet material together with the strip of product thereon into sections and stacking the sections one on another to produce a stack of product slices interleaved with the sheet material.

Apparatus for the manufacture of slices of processed cheese from a hot mass of cooked cheese in accordance with the method of the invention will now be described, by way of example, with reference to the accompanying drawings, in which:

FIG. 2 is a diagrammatic side elevation of a modification of the apparatus of FIG. 1, and FIG. 3 is a diagrammatic side elevation of the downstream end portion of a modification of the apparatus of FIG. 2.

Figure 1:
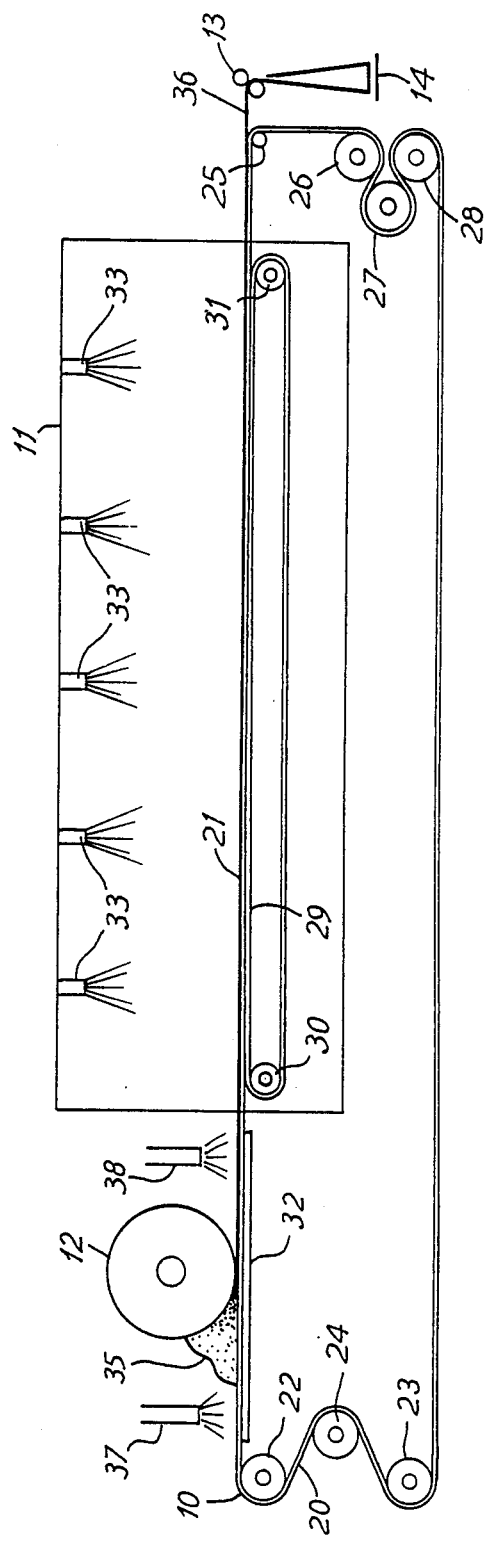
FIG. 1 is a diagrammatic side elevation of one construction of the apparatus.

The apparatus shown in FIG. 1 comprises an endless belt conveyor 10, a cooling chamber 11, a spreader roller 12, a slitter device 13 and a stacking device 14.

The conveyor 10 comprises an endless belt 20 having a substantially horizontal upper run 21, the belt extending around two guide rollers 22, 23 and a tension roller 24 at the upstream end of the conveyor and the belt extending around a guide roller 25 and three drive rollers 26, 27, 28 at the downstream end of the conveyor, the drive rollers having a herring-bone fluted surface. The major portion of the upper run 21 of the belt extends through the cooling chamber 11 and is supported therein by an auxiliary endless belt 29 mounted around end rollers 30, 31. The part of the upper run 21 of the belt upstream of the cooling chamber 11 is in sliding engagement with the upper surface of a nylon support plate 32 fixed to the frame of the conveyor. The belt 20 is made of flexible plastics material, for example a polyester, provided with a release coating which does not adhere to cheese. Plastics film coated with such release agents are well known in the art, for example the coated film manufactured by E. I. du Pont de Nemours & Company in the United States under the Registered Trade Mark MYLAR CS for use in wrapping food products. The plastics material of the belt 20 must of course be capable of withstanding the temperature of the hot cheese mass used in the manufacture of processed cheese, usually 85° C.

The cooling chamber 11 can be of any suitable construction and may be fitted with spray heads 33, cooling plates, or a cold air system, in which the cooling medium may for example be liquid carbon dioxide, liquid nitrogen or brine. Such cooling chambers are well known in the art.

The spreader roller 12 extends horizontally across the part of the upper run 21 of the belt which is supported by the nylon plate 32, and is driven by a motor (not shown). The spreader roller is coated with TEFLON (Registered Trade Mark) and is spaced above the belt at a distance equal to the thickness of the slices of cheese to be produced by the apparatus.

In operation, the endless belt 20 is driven by the rollers 26, 27, 28 at a constant speed, the spreader roller 12 is driven in a direction and at a speed such that its lower peripheral surface is travelling in the same direction and at substantially the same speed as the upper run 21 of the belt, and a hot cheese mass which has been cooked to a temperature of approximately 85° C. is extruded continuously onto the upstream end of the upper run 21 of the belt. The cheese mass accumulates on the belt immediately upstream of the spreader roller 12 to form a reservoir 35 of the cheese, and the combined movements of the spreader roller and the belt cause cheese from the reservoir to be forced through the gap between the spreader roller and the belt and thereby spread the cheese into a thin layer which is carried by the belt into the cooling chamber. The nylon plate 32 supports the belt against any downward thrust exerted on the cheese by the spreader roller. The part of the belt passing through the cooling chamber, and the cheese thereon, is supported by the upper run of the auxiliary belt 29 which is driven in the same direction and at the same speed as the upper run of the belt 20. The cooling chamber is designed to cool the layer of cheese down to a temperature of approximately 5° C. at which temperature the cheese is in a solid state and forms a thin broad strip of cheese. The broad strip of cheese is peeled off the belt 20 at the point where it passes round the guide roller 25 at the downstream end of the upper run of the belt. The broad strip of cheese, denoted by the reference 36 in the drawing, is fed to the slitter device 13 which slits the broad strip of cheese longitudinally into narrow strips, and the narrow strips of cheese are stacked one above the other on an endless conveyor in the stacking device 14 and then divided laterally to form stacks of individual slices of cheese. Slitter and stacking devices for this purpose are in common use in conventional equipment for manufacturing slices of processed cheese, and have therefore not been described or illustrated in detail.

In the apparatus of FIG. 1, the hot cheese does not adhere to the belt due to its coating of a release agent, so that the broad strip of solid cheese at the downstream end of the belt can easily be peeled off without tearing the strip. The apparatus of FIG. 1 may however be provided with a spraying device 37 arranged to spray the upstream end of the belt with a release agent, such as sodium alginate, to further reduce any slight adhesion between the cheese and the belt. The apparatus of FIG. 1 may also be provided with an additional spraying device 38 arranged to spray the top surface of the layer of hot cheese with sodium alginate to reduce adhesion between the slices of cheese when stacked in the stacking device.

The apparatus of FIG. 2 is similar to that of FIG. 1 and like parts are denoted by like reference numerals. The apparatus of Figure 2 however also includes a web 40 of plastics material supported on the belt 20. The web 40 is fed from a roll of the material mounted on a reel 41 at the upstream end of the belt 20 and extends along the full length of the upper run of the belt 20, around the guide roller 25, and then downwards to a storage reel 42 on which the web is rewound. The web 40 of plastics film material extends across the full width of the belt 20. The belt 20 can conveniently be made of stainless steel.

The web 40 is coated with a release agent to prevent hot cheese adhering to the web and can conveniently be the film material marketed by E. I. du Pont de Nemouts under the Registered Trade Mark MYLAR CS referred to above. The belt conveyor 10 and the spreader roller 12 are driven as previously described, and the web 40 is driven by frictional engagement with the belt 20 at the same speed as the belt.

The hot cheese is extruded directly onto the web 40, and the cheese on the web 40 is spread into a thin layer during passage below the spreader roller 12. The cheese layer solidifies into a thin broad strip of cheese during passage through the cooling chamber. The broad strip of cheese is peeled off the web 40 at the point where the web passes round the guide roller 25, and the broad strip of cheese is fed to the slitter device 13 and the stacking device 14 as in the apparatus of FIG. 1.

The apparatus of FIG. 3 is similar to that of FIG. 1 and like parts are denoted by like reference numerals. In the apparatus of FIG. 3 however the web 40 is not rewound on a storage reel but instead the web 40 together with the broad strip of cheese 36 thereon is peeled off the belt 20 at the guide roller 25 and divided longitudinally into narrow strips by the slitter device. The narrow strips of plastics material together with the strips of cheese thereon are stacked and divided transversely in the stacking device so that the cut length of the web of plastics material are interleaved between the individual slices of cheese in the final stack of cheese slices.

In the further modification described above, the belt 20 of the conveyor 10 can be made of steel and the continuously web of film material can be made of any suitable plastics which can withstand the temperature of the hot cheese mass. It is not necessary for the operation of the apparatus to use plastics film material provided with a release coating to prevent the cheese adhering to the plastics film material, since the cheese is not separated from the web of film material. The web of plastics film material may however be provided with a coating of a release agent to facilitate separation of the individual slices of cheese from the cut lengths of the plastics web by the consumer.

I claim:

1. In a method of producing individual slices of a solid food product containing fat which is plastic or viscous when heated which includes casting a hot mass of the product onto a conveyor comprising an endless belt and terminal rollers at opposite ends of the conveyor, the belt extending around the terminal rollers and the length of the belt between the upper surfaces of the terminal rollers forming the upper run of the belt, spreading the hot mass of the product into a layer supported by the upper run of the belt having a thickness approximately equal to the desired thickness of the slices, driving the belt of the conveyor to move the layer of product through a cooling chamber to solidify the product into a solid strip, removing the strip from the conveyor, and then dividing the strip into individual slices, the improvement which consists essentially of laying a web of film material which does not adhere to the product on the upper run of the belt, casting the hot mass of product directly onto said web, forming said mass into a layer on said web, carrying said web bearing the product layer with the conveyor belt, by means of frictional force between the web and the belt, through the cooling chamber to solidify the product and then peeling the solid layer of product from the web without the use of doctor means.

2. The method claimed in claim 1 and including drawing said web from a roll positioned at one end of the conveyor and winding it up, after product has been peeled from it, at the other end of the conveyor.

3. A method as claimed in claim 1 in which the upper run of the belt travels in the direction from one of said terminal rollers to the other of said terminal rollers, the end of the conveyor fitted with said one terminal roller forms the upstream end of the conveyor and the end of the conveyor fitted with said other terminal roller forms the downstream end of the conveyor, wherein the web of flexible sheet material is fed from a roll at the upstream end of the conveyor and the web is wound onto a reel at the downstream end of the conveyor.

4. In a method of producing individual slices of a solid food product which is plastic or viscous when heated, with the slices interleaved with film material, which includes casting a hot mass of the product onto a conveyor comprising an endless belt and terminal rollers at opposite ends of the conveyor, the belt extending around the terminal rollers and the length of the belt between the upper surfaces of the terminal rollers forming the upper run of the belt, spreading the hot mass of the product into a layer supported by the upper run of the belt and having a thickness approximately equal to the desired thickness of the slices, driving the belt of the conveyor to move the layer of product through a cooling chamber to solidify the product into a solid strip, removing the strip from the conveyor, dividing the strip into sections, and stacking said sections one on another with film interleaved therebetween, the improvement which consists essentially of laying a web of film material on the upper run of the belt, casting the hot mass of product directly onto said web, forming said mass product into a layer on the web, carrying the web with the cast product with the belt conveyor, by frictional force between the belt and the web, through said cooling chamber to solidify the product, removing the web with the solid layer of product from the upper run of the belt without doctor means, dividing the web with the layer of solid product thereon into sections and stacking said sections to product a stack of product slices interleaved with film material.

5. A method as claimed in claim 4, wherein said web is made of plastics film material provided with a release coating which does not adhere to the product.

6. A method as claimed in claim 4, or claim 5, in which the hot product is a mass of cooked cheese.

* * * * *